United States Patent
Milliorn et al.

(10) Patent No.: US 6,647,096 B1
(45) Date of Patent: Nov. 11, 2003

(54) SYSTEM AND METHOD FOR REMOTELY CONTROLLING AUTOMATED CALL PLACEMENT CALL MONITORING FUNCTIONS

(75) Inventors: Danny C. Milliorn, Waxahachie, TX (US); John Beck Mow, Dallas, TX (US); Uday R. Parekh, Plano, TX (US)

(73) Assignee: Telequip Labs, Inc., Richardson, TX (US)

( * ) Notice: Subject to any disclaimer, the term of this patent is extended or adjusted under 35 U.S.C. 154(b) by 0 days.

(21) Appl. No.: 09/546,844

(22) Filed: Apr. 11, 2000

(51) Int. Cl.[7] .......................... H04M 3/22; H04M 15/00
(52) U.S. Cl. ...................... 379/35; 379/133; 379/32.01
(58) Field of Search .................. 379/32.01, 35, 379/133, 265.02, 265.03, 265.06

(56) References Cited

U.S. PATENT DOCUMENTS

| | | | |
|---|---|---|---|
| 4,839,917 A | * 6/1989 | Oliver | 379/45 |
| 4,935,956 A | 6/1990 | Hellwarth et al. | |
| 5,416,831 A | 5/1995 | Chewning, III et al. | |
| 5,485,507 A | 1/1996 | Brown et al. | |
| 5,524,141 A | 6/1996 | Braun et al. | |
| 5,535,261 A | 7/1996 | Brown et al. | |
| 5,655,013 A | * 8/1997 | Gainsboro | 379/188 |
| 5,805,685 A | 9/1998 | McFarlen | |
| 5,862,519 A | 1/1999 | Sharma et al. | |
| 5,923,746 A | 7/1999 | Baker et al. | |
| 5,926,533 A | * 7/1999 | Gainsboro | 379/188 |
| 5,937,042 A | * 8/1999 | Sofman | 379/112.05 |
| 6,560,323 B2 | * 5/2003 | Gainsboro | 379/188 |

* cited by examiner

Primary Examiner—Ahmad F. Matar
Assistant Examiner—Hector Agdeppa (57) ABSTRACT

A system and method for remotely controlling the call monitoring functions performed by an automated call placement system (ACP) and an ACP incorporating the system or the method. In one embodiment, the system includes: (1) a controller, coupled to the call monitoring unit and having a single wire pair interface, that transmits traffic carried on the selected one of the lines via the interface, transmits function menus via the interface, receives in-band control commands via the interface and controls functions of the call monitoring unit in response thereto and (2) an in-band data-capable device having a display, coupled to the interface via a single wire pair, that receives and audibly reproduces the traffic, displays the function menus on the display and transmits the in-band control commands to the controller thereby to control the call monitoring unit.

21 Claims, 5 Drawing Sheets

SYSTEM AND METHOD FOR REMOTELY CONTROLLING AUTOMATED CALL PLACEMENT CALL MONITORING FUNCTIONS

TECHNICAL FIELD OF THE INVENTION

The present invention is directed, in general, to automated call placement systems (ACPs) and, more specifically, to a system and method for remotely controlling the call monitoring functions performed by an ACP and an ACP incorporating the system or the method.

BACKGROUND OF THE INVENTION

Inmates at correctional facilities have begun to regard access to a telephone to be a valuable privilege. Years ago, correctional facilities (prisons, jails and the like) made a few telephones available at a central location. To ensure that the inmates said nothing inappropriate, correctional officers (or, more colloquially, "guards") stood by or listened on nearby telephones to inmate conversations.

Soon, however, correctional facilities began to install ACPs with distributed telephones, perhaps with a telephone in each inmate's cell. Denied their convenient central location, correctional officers began to be required to monitor conversations more closely. Controls (such as individual access codes) began to be put into place to ensure that only inmates who had earned the privilege were allowed access to a telephone. Correctional officers began to use dedicated call monitoring telephones to monitor conversations.

ACPs then began to be fitted with recorders, so conversations could be stored and played back at will. The earliest recorders were multiple track tape recorders wherein each track was assigned to monitor each outbound trunk line. The recorders were placed into a continuous recording mode, so that all conversations were recorded. If a particular conversation or conversations were desired to be played back or archived, each conversation on each track was required to be scanned to find the right one(s).

More sophisticated call monitoring units eventually replaced tape recorders. These units employed disk storage in lieu of tape and stored conversations in digitized form on the disks. The correctional officer could then scan through the conversations taking place at a particular time, monitor a particular one of the conversations at length and search the call monitoring unit for the particular file containing the conversation in its entirety to allow him to hear the parts of the conversation he may have missed. Unfortunately, performing these operations required a direct connection to the unit or a connection to the unit through a computer network.

Correctional facilities provide unique challenges for installers of telephone systems. Thick walls and an absence of crawlspaces make running wires difficult. Therefore, any improvement in the connections an ACP or its associated call monitoring unit requires would be advantageous. Accordingly, what is needed in the art is a way to make such ACPs and monitoring units less dependent upon special connections. Further, what is needed in the art is more flexibility in the way conversations can be monitored and recorded.

SUMMARY OF THE INVENTION

To address the above-discussed deficiencies of the prior art, the present invention provides a system and method for remotely controlling the call monitoring functions performed by an automated call placement system (ACP) and an ACP incorporating the system or the method. In one embodiment, the system includes: (1) a controller, coupled to the call monitoring unit and having a single wire pair interface, that transmits traffic carried on the selected one of the lines via the interface, transmits function menus via the interface, receives in-band control commands via the interface and controls functions of the call monitoring unit in response thereto and (2) an in-band data-capable device having a display, coupled to the interface via a single wire pair, that receives and audibly reproduces the traffic, displays the function menus on the display and transmits the in-band control commands to the controller thereby to control the call monitoring unit.

The present invention therefore introduces the broad concept of allowing an ACP to be remotely controlled via a single wire pair. This offers substantial utility by greatly increasing the number of locations at which remote control can be effected. Any location within the correctional facility wired for conventional telephone service becomes a possible remote location. Furthermore, any offsite location reachable by a computer network, the public switched telephone network (PSTN) or a combination of the two becomes a candidate location.

In one embodiment of the present invention the in-band control commands are ADSI control commands and the device is an ADSI device. Those skilled in the art are familiar with the ADSI protocol. ADSI offers two advantages. First and foremost, it does not require an extra pair of wires; so, a single wire pair can support user traffic and ADSI-encapsulated information and commands. Second, it is a recognized standard with which an ever-increasing number of telephones comply. The present invention is therefore not limited to a particular ADSI-compliant telephone manufacturer. Furthermore, the present invention is not limited to ADSI, and can operate with any conventional or later-discovered single-wire-pair-capable command protocol.

For purposes of the present invention, "in-band" is to be construed broadly as meaning "along with user traffic." In the digital domain, "in-band" means in the same channel. In the analog domain, "in-band" means over the same wire-pair. Commands may be transmitted at frequencies over or under those of user traffic, or may be interspersed into the user traffic during times of silence (as is the case with ADSI). The present invention does not limit the manner in which in-band signaling takes place.

In one embodiment of the present invention, the display is a liquid crystal display (LCD). All currently commercially available ADSI telephones come with LCD screens upon which information transmitted in accordance with the ADSI standard may be displayed. Such display may be telephone line-powered, but is most often powered by a separate source. The present invention is not limited, however, to a particular display type, size or configuration.

In one embodiment of the present invention, the device comprises buttons and the function menus associate the buttons with the in-band control commands. These software-configurable, or "soft" buttons are employable to convey menu selections to the controller of the present invention. Of course, the buttons may be "hard-wired" to provide a given function and therefore not programmable.

In one embodiment of the present invention, at least one of a computer network and a public switched telephone network are interposed between said controller and said device. The computer network may be, for example, the Internet. Thus, the device may be quite remote from the controller, allowing multiple correctional facilities to be monitored from a central monitoring site. This may be particularly advantageous when foreign language interpretation is required.

In one embodiment of the present invention, the function menus comprise a scanning mode menu including a choice selected from the group consisting of: (1) silent seek, (2) voice scan, (3) monitor and (4) save. Those skilled in the pertinent art will understand, however, that other menu choices and corresponding modes (such as barge in and disconnect) are within the broad scope of the present invention.

The device may also function as a PBX line extension off of the ACD, where the device can originate a call into the ACD to any one of the lines connected to the ACD, such as inmate telephone lines, external PSTN circuits or other devices as may be advantageous. The device may thus be able to support conferencing, wherein a correctional officer or other monitoring individual may desire to place a call with the device to another PBX extension or another telephone via the PSTN or computer network.

In one embodiment of the present invention, the function menus comprise a replay menu including a choice selected from the group consisting of: (1) play, (2) stop, (3) pause, (4) restart, (5) skip backward and (6) skip forward. Those skilled in the art will recognize these choices as being advantageous in replaying a particular recorded conversation. The present invention is not, however, limited to these choices.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
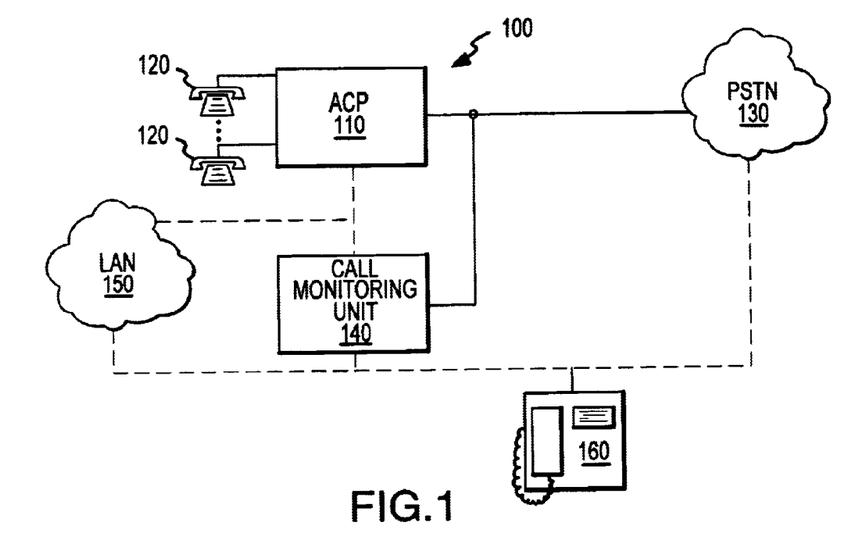
FIG. 1 illustrates a block diagram of an automated call placement system (ACP) having a switching service unit and a call monitoring unit that forms an environment within which the system or method of the present invention can be incorporated.

Referring initially to FIG. 1, illustrated is a block diagram of an automated call placement system (ACP), generally designated 100. The ACP 100 is illustrated as including a switching service unit (SSU) 110. The SSU 110 is designed to act as a hub like a private branch exchange (PBX) comprising the SSU 110 and a plurality of stations 120. The SSU 110 acts to interconnect ones of the plurality of stations 120 with ones of a plurality of trunks (telephone lines for gaining access to the public switched telephone network, or PSTN, 130). The SSU 110 may be a conventional, commercially available SSU or any later-developed one capable of interconnecting stations with trunks. (Although only a few stations 120 are illustrated, those skilled in the pertinent art will understand that fewer or more can be supported.)

Though not an exclusive environment for the present invention, the illustrated embodiment of the ACP 100 is adapted for use in a correctional facility (not illustrated) to allow inmates (not illustrated) to place calls to without the facility. Each of the plurality of stations 120 preferably has a keypad for allowing an inmate to enter a code unique to each inmate or speech recognition capability to allow the inmate to speak the code. The code may be, for example, a publicly known inmate number, a private personal identification number (PIN) or a combination of the two. The inmate then provides a destination telephone number to be dialed. Having provided one or more codes and the destination number, the SSU 110 seizes an available trunk signals the PSTN 130 to initiate a call to the destination number and completes the call in a purely conventional (typically collect) manner. In the case of collect calling, the inmate's code may be verified before siezing a trunk. When the call is terminated (by the inmate, a called party or perhaps a correctional officer), the SSU 110 releases the station from which the inmate placed the call and the trunk involved.

The SSU 110 may be capable of receiving inbound calls from the PSTN 130 destined for one of the plurality of stations 120 or completing intra-PBX calls from one of the plurality of stations 120 to another. However, correctional facilities routinely disable these capabilities on the theory that the public should not be allowed direct access to inmates and that intra-PBX calling may further inmate conspiracies. (Some facilities do allow attorneys to place inbound calls by means of special dialing codes.)

As described above, it is important in some environments to monitor, and perhaps record, the conversations that take place on the plurality of stations 120. In the context of a correctional facility, inmate conversations should be monitored for purposes of security. In other environments, policy compliance or quality control may be of concern. Accordingly, the ACP 100 is illustrated as including a call monitoring unit 140. The structure and function of the call monitoring unit 140 will be set forth in greater detail in conjunction with FIG. 3.

Broadly speaking, the call monitoring unit 140 monitors (taps), and perhaps records, conversations taking place between the plurality of stations 120 and the PSTN 130. The call monitoring unit 140 does this by tapping either trunks or station lines (FIG. 1 illustrates the former), recording one or both sides or the conversation. While the call monitoring unit 140 may simply monitor each trunk or station continuously (requiring one channel per trunk or station), the illustrated call monitoring unit 140 detects when trunks or stations are active, and then selects a channel for that trunk or station.

The call monitoring unit 140 may be analog, but is digital in the illustrated embodiment. Accordingly, the call monitoring unit 140 may take the form of a software-programmed general-purpose computer with telephony interface cards, such as those commercially available from Dialogic Corporation of Parsippany, N.J. The call monitoring unit 140 is illustrated as optionally being connected directly to the SSU 110 (depicted in FIG. 1 by a broken line directly spanning the call monitoring unit 140 and the SSU 110). Though not required, a connection between the call monitoring unit 140 and the SSU 110 allows the call monitoring unit 140 to receive data from the SSU 110 regarding calls to be placed through the SSU 110. Were the connection not to be available, the call monitoring unit 140 would be required to detect calls and associated data (such as destination number) from its trunk or station tap.

FIG. 1 further illustrates a local area network (LAN) 150 that may optionally couple the call monitoring unit 140 to the SSU 110 (depicted in FIG. 1 by a broken line spanning the call monitoring unit 140 and the SSU 110).

Many currently commercially available SSUs come with LAN interfaces or data communication ports (e.g., at least one serial or parallel port). Likewise, since the call monitoring unit 140 is illustrated as being embodied in a computer system, the call monitoring unit 140 can be provided with a conventional LAN interface or data communication port (typically taking the form of an adapter card). Thus coupled via the interface or port, the call monitoring unit 140 and the SSU 110 can be physically separated from one another, and other devices, such as controllers (not shown) for the ACP as a whole can be made to interact with the call monitoring unit 140 or the SSU 110.

It should be noted that the call monitoring unit 140 may be physically separate from, or integrated with, the SSU 110. The present invention can work with either configuration.

FIG. 1 finally shows an in-band data-capable device 160 that takes the form of an Analog Display Services Interface (ADSI)-capable telephone in the illustrated embodiment. ADSI is a telecommunications protocol standard published by Bellcore in December, 1993 (Analog Display Services Interface (ADSI) SPCS/Server Generic Requirements, GR-1273-CORE, Issue 1 July 1998), and incorporated herein by reference. ADSI enables alternate voice and data capability over the existing analog telephone network, in which single wire pairs couple stations together; separate wire pairs are not available for signaling or data transfer between the stations. The present invention makes advantageous use of ADSI, or other conventional or later-developed single-wire-pair protocols, to allow the device 160 to control the call monitoring unit 140 through only a single wire pair. This yields substantial flexibility in terms of device 160 location and installation cost, particularly in difficult environments, such as correctional facilities.

The device 160 is shown as being couplable to the call monitoring unit 140 in a number of optional ways. First, the device 160 may be coupled directly to the call monitoring unit 140. (In such case, the call monitoring unit is provided with an ADSI-capable interface.) Second, the device 160 may be coupled to the call monitoring unit 140 via the LAN 150. (In such case, ADSI-encapsulated information and commands are further encapsulated during their transmission over the LAN 150.) Third, the device 160 may serve as a station in the PBX, and therefore be coupled to the call monitoring unit 140 through the SSU 110. Fourth, the device 160 may be coupled to the call monitoring unit 140 via the PSTN 130. This would allow the device to be located in any place in the world that is reachable by telephone. Finally, the device 160 may be wirelessly coupled to the call monitoring unit 140 directly or via any of the other above-described intermediaries (LAN 150, SSU 110 or PSTN 130). In such case, though the device 160 may no longer communicate through a single wire pair, it nonetheless remains capable of communicating with and controlling the call monitoring unit 140 without requiring wireless bandwidth exceeding that required for voice communication.

Figure 2:
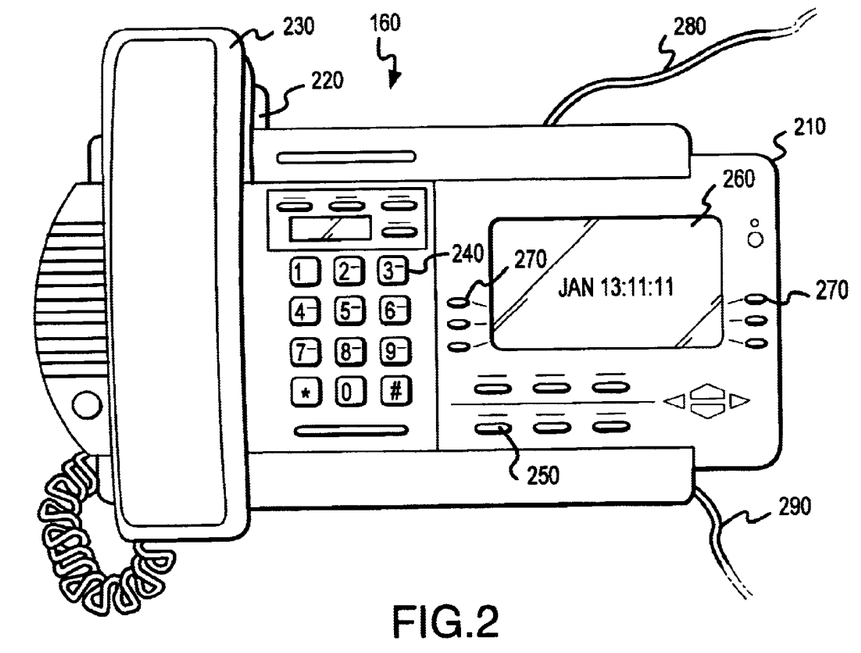
FIG. 2 illustrates an in-band data-capable device having a display and coupled via a single wire pair interface to the call monitoring unit of FIG. 1.

Turning now to FIG. 2, illustrated is the in-band data-capable device 160 of FIG. 1, which is conventional in all respects, except that it can be programmed according to the principles of the present invention to control a call monitoring unit. The device 160 is illustrated as having a body 210 in which a cradle 220 is formed, a handset 230 disposed within the cradle 220 and having a microphone and speaker (not separately referenced) located therein, a keypad 240, dedicated buttons 250 that control functions of the device 160 and a display 260 that takes the form of an LCD.

The display 260 is adapted to show a plurality of lines of alphanumeric text and special characters, with a given number of characters per line. In the illustrated embodiment, the display 260 is capable of displaying seven lines, with 24 characters per line.

Located adjacent and to each side of the display 260 are a plurality of software-configurable, or "soft" buttons 270. The soft buttons correspond to specific lines on the display 260, such that characters may be displayed on the display 260 that correspond to particular soft buttons 270.

The device 160 receives user traffic through a conventional single wire pair interface (not illustrated) and a single wire pair 280 and reproduces the traffic on the speaker of the handset 230. The device 160 further receives user traffic through the microphone of the handset 230 and transmits the traffic through the single wire pair. The device 160 receives ADSI-encapsulated information from the call monitoring unit 140 of FIG. 1 and displays the ADSI-encapsulated information on the display 260. The device 160 may also generate ADSI-encapsulated commands (usually in response to depression of one of the soft buttons 270) intended to control the call monitoring unit 140 of FIG. 1. The device 160 transmits these ADSI-encapsulated commands over the single wire pair 280 to the call monitoring unit 140.

In the illustrated embodiment of the present invention, the device 160 receives electrical power through a separate power line 290 or battery. Most currently available ADSI-capable devices are unable to draw sufficient current from the single wire pair 280 to power the display 260. Thus, they employ the separate power line 290 or supply.

Those skilled in the pertinent art will understand that the device 160 may assume alternative embodiments. For example, a multimedia personal computer may be programmed to reproduce user traffic on a speaker thereof, accept and display ADSI-encapsulated information and provide ADSI-encapsulated commands. An ADSI unit having a display and soft buttons may also augment a non-ADSI telephone to yield a suitable device 160.

Figure 3:
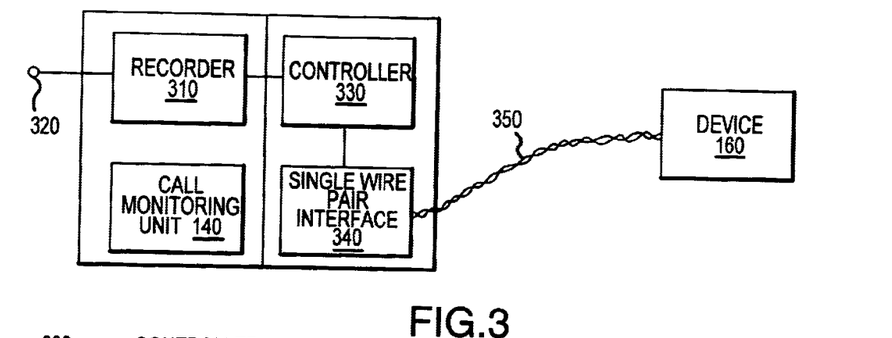
FIG. 3 illustrates a block diagram of a system for remotely controlling the call monitoring unit of FIG. 1 constructed according to the principles of the present invention.

Turning now to FIG. 3, illustrated is a block diagram of a system for remotely controlling the call monitoring unit 140 of FIG. 1 constructed according to the principles of the present invention. The system is illustrated for convenience's sake as being associated with the call monitoring unit 140. The call monitoring unit 140 is, in turn, associated with a recorder 310 that monitors, via one or more taps 320, lines (station or trunk) associated with the SSU 110 of FIG. 1.

In the illustrated embodiment of the present invention, the system takes the form of a sequence of software instructions that are executable in a controller 330 to drive the device 160 and thereby provide user traffic to be reproduced, and ADSI-encapsulated information to be displayed, to the device 160 and control the call monitoring unit 140 (and perhaps the recorder 310) in response to ADSI-encapsulated commands received from the device 160. The system performs these functions via a single wire pair interface 340 coupled to the controller 330. A single wire pair 350 couples the single wire pair interface 340 to the device 160.

In alternative embodiments, a LAN or SSU or the PSTN may be interposed between the controller 330 and the device 160. In such case, the single wire pair interface 340 may not be directly coupled to the controller, but may be coupled to the intervening LAN, SSU or PSTN.

Figure 4:
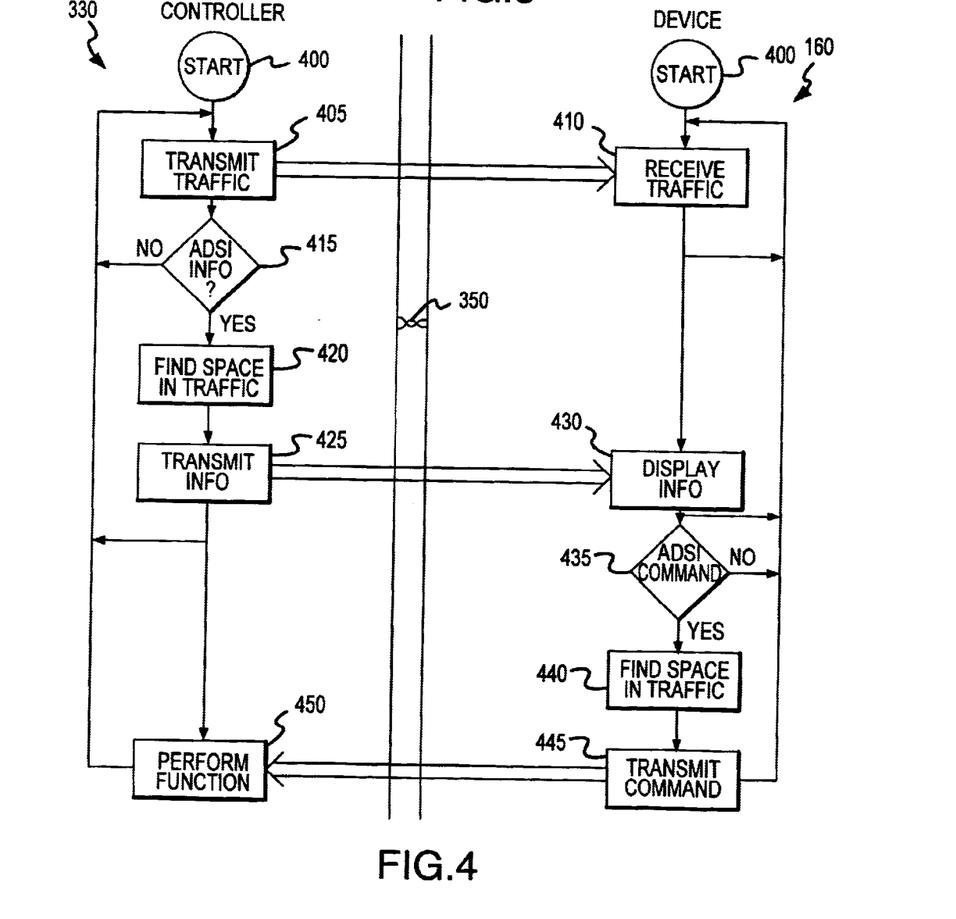
FIG. 4 illustrates a flow diagram of a method of remotely controlling the call monitoring unit of FIG. 1 carried out according to the principles of the present invention.

Turning now to FIG. 4, illustrated is a flow diagram of a method of remotely controlling the call monitoring unit 140 of FIG. 1 carried out according to the principles of the present invention. FIG. 4 is actually a hybrid form of flow diagram in which separate flow diagram portions are set forth side-by-side for the controller 330 (left side portion) and device 160 (right side portion). The single wire pair 350 is shown between the flow diagram portions. Thus arranged, the flow diagram as a whole best represents how the controller 330 and device 160 interact during operation.

The method begins in a start step 400, in which power is applied to the controller 330 and the device 160. The controller 330 then begins to signal the device 160 in a conventional manner to initialize the device 160. From the standpoint of a user (perhaps a correctional officer) situated at the device 160, the display on the device 160 will begin to display messages indicating that the device 160 has been activated.

Processing then continues in a step 405, in which calls are made and monitored. The call monitoring unit 140 intercepts and transmits user traffic via the single wire pair interface (340 of FIG. 3) to the device 160, which receives and displays the user traffic (in a step 410).

Processing continues to a decisional step 415, in which the controller 330 determines whether the controller 330 has any ADSI-encapsulated information (often pertaining to function menus or call status information) to transmit to the device 160. If not, the controller 330 continues to transmit user traffic to the device 160.

If the controller 330 determines that ADSI information should be sent to the device 160, processing continues to a step 420, in which the ADSI information is queued for insertion in-band in a manner that comports with the ADSI standard.

Processing continues in a step 425, wherein the controller 330 interjects the ADSI-encapsulated information into the user traffic. The ADSI-encapsulated information is then transmitted via the single wire pair 350 to the device 160. In response, the device 160 receives and displays the ADSI-encapsulated information in a step 430. Once the controller 330 has transmitted the ADSI-encapsulated information, transmission of user traffic can continue (the step 405).

On the display 160 side of the flow diagram, the device 160 receives and reproduces user traffic (traversing a loop between the step 410 and a decisional step 435). If a user gives a command (typically by pushing a soft button), the device 160 takes a "YES" branch of the decisional step 435, proceeding to a step 440, in which a space in the user traffic is located. Again, techniques for identifying a suitable space are known.

Once the device 160 has located the space, processing continues in a step 445, wherein the device 160 interjects the ADSI command into the user traffic. The ADSI command is then transmitted via the single wire pair 350 to the controller 330. In response, the controller 330 receives and responds accordingly to the ADSI command in a step 450, performing one or more functions. Once the device 160 has transmitted the ADSI command, receipt and reproduction of user traffic can continue (the step 410).

Figure 5:
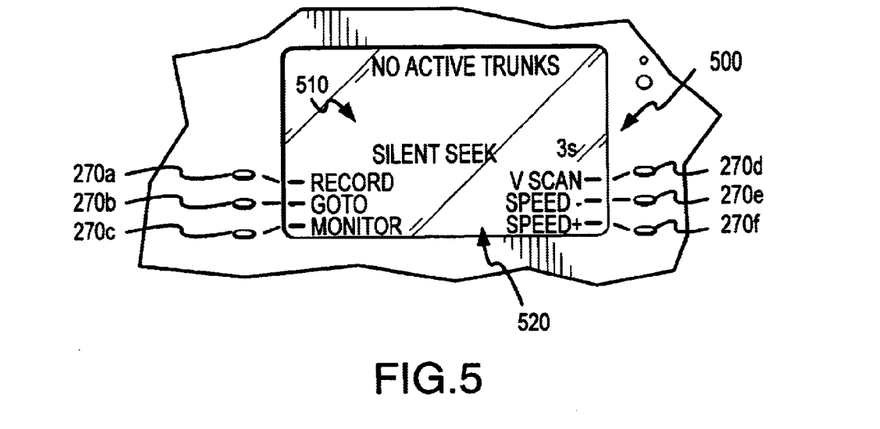
FIG. 5 illustrates a diagram of a first function menu displayed during times at which no trunks are active.

Turning now to FIG. 5, illustrated is a diagram of a first function menu, generally designated 500, displayed during times at which no trunks are active.

The first function menu 500 contains a status area 510 illustrated as containing the messages "No Active Trunks," "Silent Seek" and "3 s." "No Active Trunks" indicates that no conversations are taking place and, thus, there is nothing to monitor. "Silent Seek" is a mode of operation in which active stations of the PBX are scanned at periodic intervals. However, any user traffic encountered is not reproduced on the device (160 of FIG. 2). "3 s" is the period of the scan interval.

The first function menu 500 further contains a menu selection area 520 that assigns menu selections to soft buttons as follows: "Record" is assigned to a soft button 270a, "Goto" is assigned to a soft button 270b, "Monitor" is assigned to a soft button 270c, "V Scan" is assigned to a soft button 270d, "Speed–" is assigned to a soft button 270e and "Speed+" is assigned to a soft button 270f.

Pressing the soft button 270a commands the call monitoring unit to save a recording of the call being scanned at the time the soft button 270a is pressed. In alternative embodiments, the recording can begin when the soft button 270a is pressed, or when the call began.

Pressing the soft button 270b commands the call monitoring unit to monitor a particular station number. This command will be set forth in greater detail with respect to FIG. 8 herein.

Pressing the soft button 270c commands the call monitoring unit to enter a monitoring mode of operation wherein the call monitoring unit monitors the call being scanned at the time the soft button 270c is pressed. The call monitoring unit accordingly begins to send user traffic pertaining to the call to the device for reproduction (so the user can monitor the conversation taking place).

Pressing the soft button 270d commands the call monitoring unit to enter a voice scan mode of operation that is identical to the silent scan mode of operation described above, except that the call monitoring unit provides user traffic corresponding to the calls being scanned to cause the device to reproduce it for the benefit of the user.

The soft buttons 270e, 270f control the period of the scan interval. According to FIG. 5, the scan interval is currently "3 s," or three seconds. Each press of the "soft button" 270e decrements the period of the scan interval by one second (down to a minimum period of two seconds in the illustrated embodiment). Each press of the "soft button" 270f increments the period of the scan interval by one second (up to a maximum period of 10 seconds in the illustrated embodiment).

Figure 6:
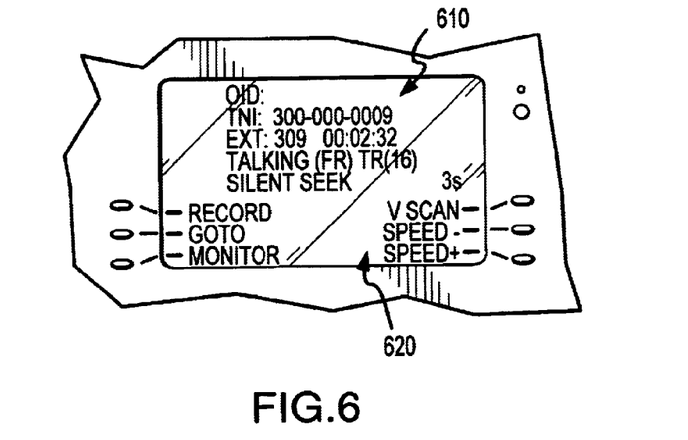
FIG. 6 illustrates a diagram of a second function menu displayed when the call monitoring unit of FIG. 1 is in a silent seek mode and at least one trunk is active.

Turning now to FIG. 6, illustrated is a diagram of a second function menu, generally designated 600, displayed when the call monitoring unit of FIG. 1 is in a silent seek mode and at least one trunk is active.

The second function menu 600 contains a status area 610 illustrated as containing the messages: "OID:," "TNI: 300-000-0007," "EXT: 707 00:00:38," "Talking (FR) TR(16)," "Silent Seek" and "3 s." "OID:" provides a PIN corresponding to a person using the station being scanned at the time (perhaps an inmate's PIN). "TNI: 300-000-0007" is the telephone number dialed by the person. "EXT: 707 00:00:38" are the extension number of the station being scanned at the time and the duration of the call being scanned at the time. "Talking" provides the call status. Possible call statuses in the illustrated embodiment are "dialing," "answered" (call completed but not accepted by called party) and "talking." "(FR)" means that the call is being recorded. "TR(16)" means that the call monitoring unit is recorded a total of 16 calls at the time. The "Silent Seek" mode of operation has been described above. "3 s" remains the period of the scan interval.

The second function menu 600 further contains a menu selection area 620 that corresponds exactly to the menu selection area 520 described in conjunction with FIG. 5.

Figure 7:
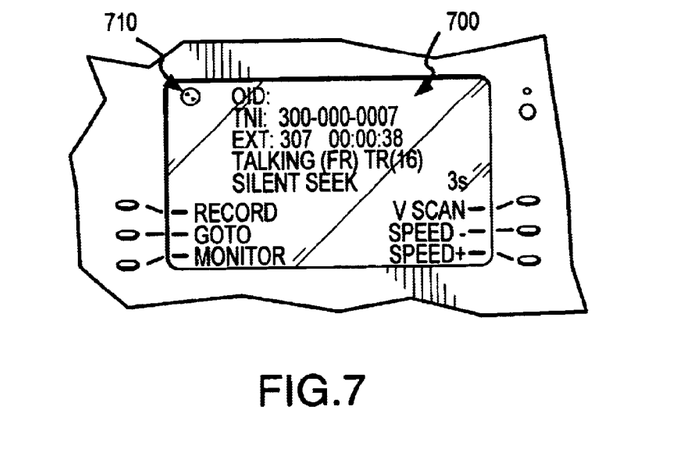
FIG. 7 illustrates a diagram of a third function menu illustrating, in particular, an update symbol.

Turning now to FIG. 7, illustrated is a diagram of a third function menu, generally designated 700 and illustrating, in particular, an update symbol 710. The update symbol 710 is an artifact of ADSI. As previously described, ADSI requires spaces in user traffic for transmission of encapsulated information or commands. The device displays the update symbol 710 when ADSI-encapsulated information is being transmitted to the device (most often completely to refresh the display). The update symbol 710 rotates to indicate update progress.

Figure 8:
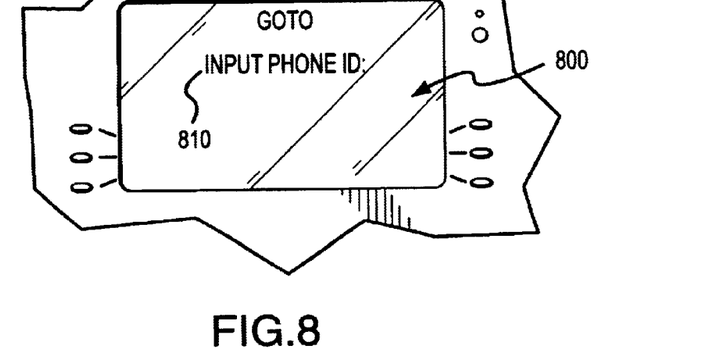
FIG. 8 illustrates a diagram of a fourth function menu displayed when generating a command to cause the call monitoring unit of FIG. 1 to monitor a particular extension.

Turning now to FIG. 8, illustrated is a diagram of a fourth function menu, generally designated 800, displayed when generating a command to cause the call monitoring unit of FIG. 1 to monitor a particular extension. Pressing the soft button 270b of FIG. 5 commands the call monitoring unit to monitor a particular station number. The call monitoring unit causes the device to display the fourth function menu 800 in response. The fourth function menu prompts the user to enter the station number ("Phone ID") of the station the user wishes to monitor. Once the user has entered the station number, the call monitoring unit enters the monitor mode of operation with respect to that station number.

Figure 9:
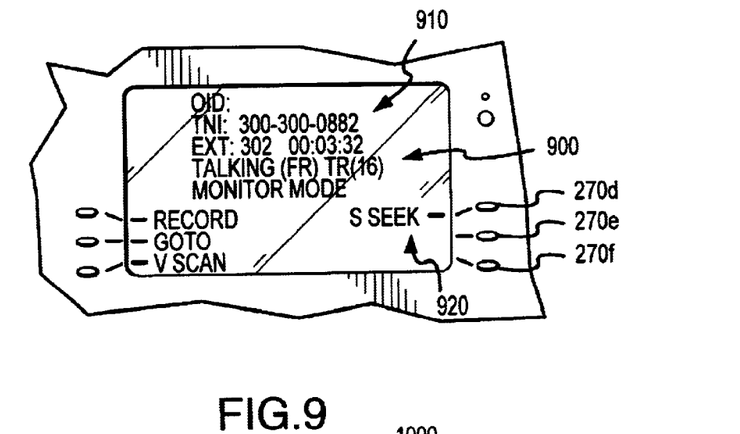
FIG. 9 illustrates a diagram of a fifth function menu displayed when the call monitoring unit of FIG. 1 is in a monitor mode.

Turning now to FIG. 9, illustrated is a diagram of a fifth function menu, generally designated 900, displayed when the call monitoring unit of FIG. 1 is in a monitor mode. The fifth function menu 900 contains a status area 910 illustrated as containing messages as described above, but with the message "Monitor Mode" instead of "Silent Seek." The monitor mode of operation has been described above.

The fifth function menu 900 further contains a menu selection area 920. Pressing the soft button 270d commands the call monitoring unit to enter the silent seek mode of operation. The soft buttons 270e, 270f, employed in the silent seek and voice scan modes of operation to control the period of the scan interval, are non sequitur in the context of the monitor mode of operation and are thus disabled in the fifth function menu 900.

Figure 10:
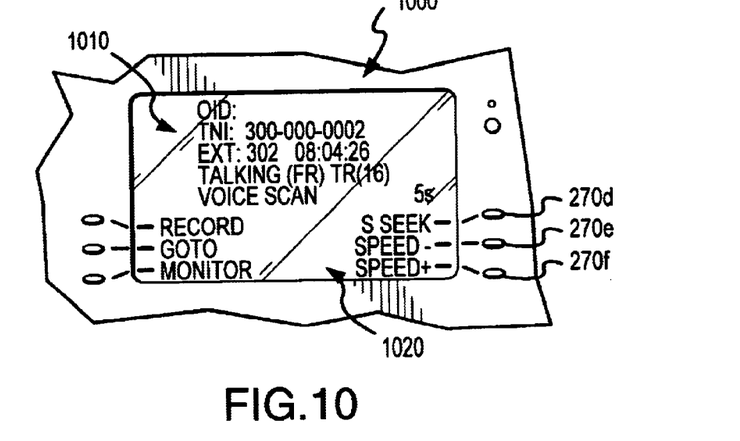
FIG. 10 illustrates a diagram of a sixth function menu displayed when the call monitoring unit of FIG. 1 is in a voice scan mode.

Turning now to FIG. 10, illustrated is a diagram of a sixth function menu, generally designated 1000, displayed when the call monitoring unit of FIG. 1 is in a voice scan mode. The sixth function menu 1000 contains a status area 1010 illustrated as containing messages as described above, but with the message "Voice Scan" instead of "Silent Seek" or "Monitor Mode." The voice scan mode of operation has been described above.

The sixth function menu 1000 further contains a menu selection area 1020. Pressing the soft button 270d commands the call monitoring unit to enter the silent seek mode of operation. The soft buttons 270e, 270f are employed as in the silent seek mode to control the period of the scan interval. In the illustrated embodiment, voice scanning can be carried out at scan interval periods of between three and 45 seconds.

Figure 11:
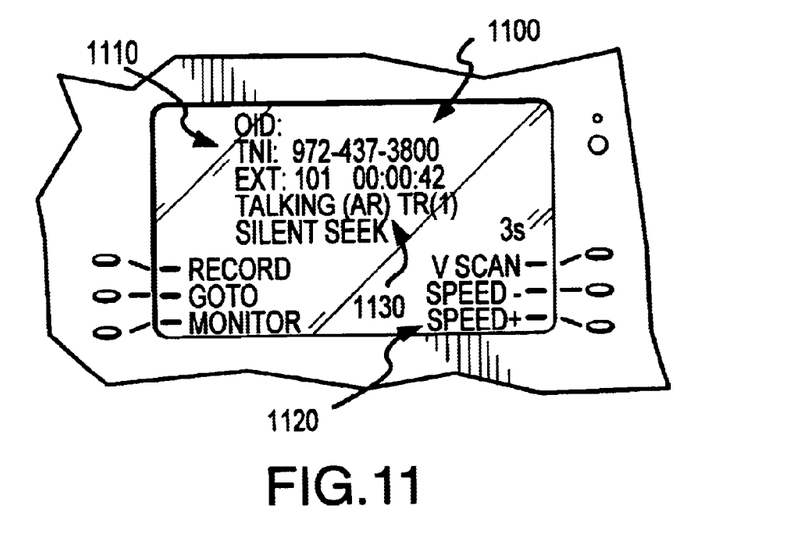
FIG. 11 illustrates a diagram of a seventh function menu displayed when the call monitoring unit is in an alert recording mode.

Turning now to FIG. 11, illustrated is a diagram of a seventh function menu, generally designated 1100, displayed when the call monitoring unit is in an alert recording mode. The seventh function menu 1100 contains a status area 1110 and a menu selection area 1120 that are as described with respect to FIG. 6, except that the status area reflects a message "Talking (AR) TR(1)". This means that the station being scanned at the time is being recorded automatically and that a total of one call is being recorded at the time.

Figure 12:
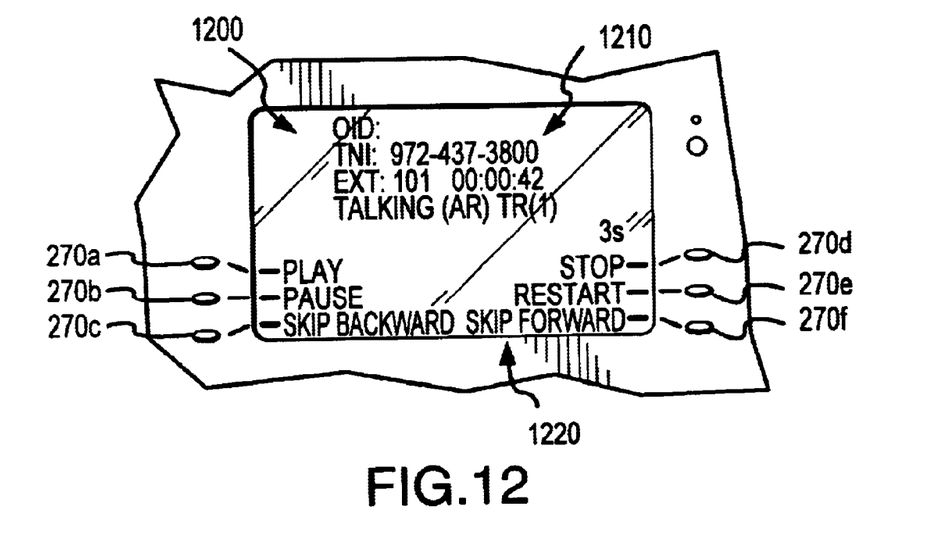
FIG. 12 illustrates a diagram of an eighth function menu displayed when the call monitoring unit is in a replay mode.

Turning now to FIG. 12, illustrated is a diagram of an eighth function menu, generally designated 1200, displayed when the call monitoring unit is in a replay mode. This allows a user to retrieve and control the playback of a previously-recorded conversation. A status area 1210 can provide real-time information regarding calls in progress or information regarding the recording being played back.

A menu selection area 1220 is configured to give a user flexibility in playing back a particular recording. The menu selection area 1220 assigns menu selections to soft buttons as follows: "Play" is assigned to a soft button 270a, "Pause" is assigned to a soft button 270b, "Skip Backward" is assigned to a soft button 270c, "Stop" is assigned to a soft button 270d, "Restart" is assigned to a soft button 270e and "Skip Forward" is assigned to a soft button 270f.

Pressing the soft button 270a commands the call monitoring unit to play a recording that has been made. Pressing the soft button 270b commands the call monitoring unit to pause playback of the recording, which allows the user to take a break and resume playback at a later time by pressing the soft button 270a.

Pressing the soft button 270c commands the call monitoring unit to skip backward in the recording. The call monitoring unit causes the recorder to play a short burst of the recording in ever-earlier portions of the recording. This allows the user to find a particular portion of interest in the recording.

Pressing the soft button 270d commands the call monitoring unit to stop playback. Pressing the soft button 270e causes playback of the recording to be restarted from its beginning. Finally, pressing the soft button 270f commands the call monitoring unit to skip forward in the recording. The call monitoring unit causes the recorder to play a short burst of the recording in ever-later portions of the recording. Used in conjunction with skip backward, skip forward gives the user a powerful tool to find a particular portion of interest in the recording.

Although the present invention has been described in detail, those skilled in the art should understand that they can make various changes, substitutions and alterations herein without departing from the spirit and scope of the invention in its broadest form.

What is claimed is:

1. For use with an automated call placement system having a switching service unit and a call monitoring unit capable of monitoring a selected one of lines coupled to said switching service unit, a system for remotely controlling said call monitoring unit, comprising:

a controller, coupled to said call monitoring unit and having a single wire pair interface, that transmits traffic carried on said selected one of said lines via said interface, transmits function menus via the interface, receives in-band control commands via said interface and controls functions of said call monitoring unit in response thereto; and an in-band data-capable device having a display, coupled to said interface via a single wire pair, that receives and audibly reproduces said traffic, displays said function menus on said display and transmits said in-band control commands to said controller thereby to control said call monitoring unit.

2. The system as recited in claim 1 wherein said in-band control commands are ADSI control commands and said device is an ADSI device.

3. The system as recited in claim 1 wherein said display is an LCD.

4. The system as recited in claim 1 wherein said device comprises buttons and said function menus associate said buttons with said in-band control commands.

5. The system as recited in claim 1 wherein at least one of a computer network and a public switched telephone network are interposed between said controller and said device.

6. The system as recited in claim 1 wherein said function menus comprise a scanning mode menu including a choice selected from the group consisting of:

silent seek, voice scan, monitor, and save.

7. The system as recited in claim 1 wherein said function menus comprise a replay menu including a choice selected from the group consisting of:

play, stop, pause, restart, skip backward, and skip forward.

8. For use with an automated call placement system having a switching service unit and a call monitoring unit capable of monitoring a selected one of lines coupled to said switching service unit, a method of remotely controlling said call monitoring unit, comprising:

transmitting traffic carried on said selected one of said lines from a controller coupled to said call monitoring unit via a single wire pair interface of said controller;

audibly reproducing said traffic with an in-band data-capable device coupled to said interface via a single wire pair;

transmitting function menus from said controller via said interface;

displaying said function menus on a display of said in-band data-capable device;

transmitting in-band control commands from said device to said controller via said interface; and controlling functions of said call monitoring unit in response to said commands.

9. The method as recited in claim 8 wherein said in-band control commands are ADSI control commands and said device is an ADSI device.

10. The method as recited in claim 8 wherein said display is an LCD.

11. The method as recited in claim 8 wherein said device comprises buttons and said function menus associate said buttons with said in-band control commands.

12. The method as recited in claim 8 wherein at least one of a computer network and a public switched telephone network are interposed between said controller and said device.

13. The method as recited in claim 8 wherein said function menus comprise a scanning mode menu including a choice selected from the group consisting of:

silent seek, voice scan, monitor, and save.

14. The method as recited in claim 8 wherein said function menus comprise a replay menu including a choice selected from the group consisting of:

play, stop, pause, restart, skip backward, and skip forward.

15. An automated call placement system, comprising:

a switching service unit;

a plurality of stations coupled to said switching service unit;

a call monitoring unit capable of monitoring a selected one of lines coupled to said switching service unit;

a controller, coupled to said call monitoring unit and having a single wire pair interface, that transmits traffic carried on said selected one of said lines via said interface, transmits function menus via the interface, receives in-band control commands via said interface and controls functions of said call monitoring unit in response thereto; and an in-band data-capable device having a display, coupled to said interface via a single wire pair, that receives and audibly reproduces said traffic, displays said function menus on said display and transmits said in-band control commands to said controller thereby to control said call monitoring unit.

16. The system as recited in claim 15 wherein said in-band control commands are ADSI control commands and said device is an ADSI device.

17. The system as recited in claim 15 wherein said display is an LCD.

18. The system as recited in claim 15 wherein said device comprises buttons and said function menus associate said buttons with said in-band control commands.

19. The system as recited in claim 15 wherein at least one of a computer network and a public switched telephone network are interposed between said controller and said device.

20. The system as recited in claim 15 wherein said function menus comprise a scanning mode menu including a choice selected from the group consisting of:
- silent seek,
- voice scan,
- monitor, and
- save.

21. The system as recited in claim 15 wherein said function menus comprise a replay menu including a choice selected from the group consisting of:
- play,
- stop,
- pause,
- restart,
- skip backward, and
- skip forward.

* * * * *